JOHN MAKECHNEY.
Improvement in Rollers for Wringers.

No. 115,491. Patented May 30, 1871.

Witnesses.
Jas. E. Hutchinson
C. L. Everit

Inventor.
John Makechney
per
Alexander Mason
Atty.

UNITED STATES PATENT OFFICE.

JOHN MAKECHNEY, OF TRENTON, NEW JERSEY.

IMPROVEMENT IN ROLLERS FOR WRINGERS.

Specification forming part of Letters Patent No. 115,491, dated May 30, 1871.

*To all whom it may concern:*

Be it known that I, JOHN MAKECHNEY, of Trenton, in the county of Mercer and in the State of New Jersey, have invented certain new and useful Improvements in Rollers for Clothes-Wringers; and do hereby declare that the following is a full, clear, and exact description thereof, reference being had to the accompanying drawing and to the letters of reference marked thereon making part of this specification.

The nature of my invention consists in an iron shaft provided with a series of longitudinal slots or openings, said slots or openings being filled with India rubber, and rubber around the shaft, which all being subjected to heat forms a solid mass, the object being to form an elastic rubber cylinder which shall not turn or become displaced upon the shaft.

In order to enable others skilled in the art to which my invention appertains to make and use the same, I will now proceed to describe its construction and operation, referring to the annexed drawing, in which—

Figure 1:
Figure 2:
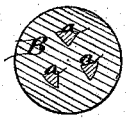

Figure 1 is a side view, and Fig. 2 a transverse vertical section of my roller.

A represents a shaft of suitable dimensions, provided with a series of longitudinal slots or openings for a certain length, leaving this portion of the shaft in the form of disconnected ribs *a a*. In the slots or openings between these ribs India rubber is placed, as well as around the shaft. This being then subjected to a heat of about 300° Fahrenheit it unites and becomes one solid mass, thus forming an elastic rubber cylinder, B, which will not turn on the shaft.

I am aware that a slotted wooden cylinder has been placed upon an iron shaft, and a rubber cylinder formed in the same manner in and around said wooden cylinder; but this is open to serious objections, the principal ones of which are, that the wooden cylinder is very apt to get loose from the shaft, and that the heat to which the rubber must be subjected to become united steams and injures the wood. These difficulties are entirely obviated by dispensing with the wooden cylinder and providing the shaft itself with longitudinal slots or openings, in and around which the rubber cylinder is formed.

Having thus fully described my invention, what I claim as new, and desire to secure by Letters Patent, is—

The shaft A provided with longitudinal slots or openings, in and around which the rubber cylinder B is formed, substantially as and for the purposes herein set forth.

In testimony that I claim the foregoing I have hereunto set my hand this 2d day of May, 1871.

JOHN MAKECHNEY.

Witnesses:
   A. N. MARR,
   C. L. EVERT.